United States Patent
Barker et al.

[11] Patent Number: 6,089,230
[45] Date of Patent: Jul. 18, 2000

[54] AIRCRAFT PASSENGER OXYGEN DELIVERY UNIT HAVING SHIFTABLE OXYGEN GENERATING CANDLE

[75] Inventors: John T. Barker, Overland Park; Phillip R. Hill, Kansas City; Peter C. Meister, Overland Park, all of Kans.

[73] Assignee: BE Aerospace Intellectual Property, Inc.

[21] Appl. No.: 09/185,458

[22] Filed: Nov. 3, 1998

[51] Int. Cl.[7] .................................................. A62B 18/08
[52] U.S. Cl. .............................. 128/204.29; 128/204.18; 128/202.26; 128/202.27; 128/205.22
[58] Field of Search ............... 128/204.29, 206.27, 128/205.24, 204.18, 202.25, 202.26, 205.22, 202.13, 202.27

[56] References Cited

U.S. PATENT DOCUMENTS

| | | |
|---|---|---|
| 3,136,312 | 6/1964 | Gattone . |
| 3,536,070 | 10/1970 | Bovard . |
| 4,154,237 | 5/1979 | Courter ............................. 128/206.27 |
| 4,197,213 | 4/1980 | Pietz et al. . |
| 4,246,229 | 1/1981 | McBride et al. . |
| 4,481,945 | 11/1984 | Levine . |
| 4,665,910 | 5/1987 | Kolbe et al. . |
| 4,766,893 | 8/1988 | Drews . |
| 4,802,472 | 2/1989 | Jung . |
| 4,840,171 | 6/1989 | Röhling et al. . |
| 4,909,247 | 3/1990 | Terrisse et al. . |
| 4,960,120 | 10/1990 | Constance-Hughes . |
| 5,078,343 | 1/1992 | Howlett . |
| 5,301,665 | 4/1994 | Jumpertz et al. ................. 128/202.26 |
| 5,816,244 | 10/1998 | Aulgur ............................. 128/206.27 |

FOREIGN PATENT DOCUMENTS

| | | |
|---|---|---|
| 2676174 | 5/1992 | France . |
| 8611223 | 4/1986 | Germany . |
| 3613814 | 10/1987 | Germany . |
| 4204532 | 3/1993 | Germany . |
| 1133942 | 1/1989 | Japan . |
| 5131036 | 5/1993 | Japan . |
| 2596691 | 9/1997 | Japan . |
| 2255509 | 11/1994 | United Kingdom . |

*Primary Examiner*—John G. Weiss
*Assistant Examiner*—V. Srivastava
*Attorney, Agent, or Firm*—Hovey, Williams, Timmons & Collins

[57] ABSTRACT

An oxygen delivery unit (20) having a housing (22), a release plate (24), an oxygen generator (26), a respirator assembly (28), a release lanyard assembly (30), and an activation lanyard assembly (32) allows the use of generators (26) having longer operational times. The release plate (24) is flexible and has curled and uncurled positions, and the generator (26) is attached to the release plate (24) which is biased toward its uncurled position. The release lanyard assembly (30) engages the generator (26) to hold it in a stored position inside the housing (22). The release lanyard assembly (30) and the activation lanyard assembly (32) extend between the generator (26) and the respirator assembly (28), so that when an individual pulls the respirator assembly (28), the generator (26) is ignited and shifted to an activated position spaced apart from the housing wall (38). Bumper pads (52) engage the release plate (24) to dampen vibrations and inhibit noise when the generator (26) is in the activated position. A lanyard pad (54) is provided to contact an ignitor (90) of the generator (26) to prevent activation lanyard lines (118) from becoming looped around the ignitor (90). A flexible heat shield (59) is interposed between the generator (26) and the housing wall (38) to deflect heat away from the housing wall (38). Both the heat shield (59) and the flexible plate (24) conform to an outer configuration of the generator (26) to save space.

15 Claims, 5 Drawing Sheets

AIRCRAFT PASSENGER OXYGEN DELIVERY UNIT HAVING SHIFTABLE OXYGEN GENERATING CANDLE

BACKGROUND OF THE INVENTION

1. Field of the Invention

The present invention is broadly concerned with improved oxygen delivery units particularly designed for emergency use by commercial aircraft passengers. More particularly, the invention pertains to such oxygen delivery units utilizing exothermic oxygen generators wherein the oxygen generator is shiftably mounted within a housing to increase the distance between the generator and the housing when the generator is activated. In preferred forms the generator is attached to a flexible release plate and held in a stored position by a release lanyard assembly. When the release lanyard assembly is separated, the release plate uncurls shifting the generator downwardly and away from the housing.

2. Description of Prior Art

Pyrotechnic charges, commonly referred to as candles, are operative to generate single gases for a variety of purposes. For example, oxygen candles, which generally employ sodium chlorate or potassium perchlorate, are commercially available where an ordinary air supply might be limited or contaminated. These candles operate at temperatures in excess of 500° F. (260° C.). These devices are typically held in a housing and supply oxygen to an individual through a mask.

Oxygen candles are commonly used in commercial passenger aircraft as oxygen generators to provide a supplemental supply of oxygen in certain emergency situations, e.g., after a drop in cabin pressure at high altitude. Most candles currently in use operate for up to 15 minutes. However, a recent increase in the desired operation time to twenty-two (22) minutes requires larger candles that burn at increased temperatures. These candles are typically held in the housings of oxygen delivery units which are typically positioned above the passengers and underneath the overhead stow bin compartments. In this area, the enlarged oxygen candles and their corresponding masks must be juxtaposed to the housing walls because there is not enough space to separate the candles from the housing walls. The excessive heat generated by the candles can damage the housings, surrounding structures or luggage and more critically can ignite the housings, surrounding structures, or luggage starting a fire on the aircraft.

In order to utilize the larger oxygen candles, some oxygen generator units utilize various mechanisms to shift the oxygen candles away from the housings when the candles are activated. For example, British Patent No. 2,111,837 discloses a slide to shift the generator, and U.S. Pat. No. 5,301,665 discloses a related approach in which the generator pivots to shift it away from the housing. These units are capable of spacing the candles away from the housings, so that the housings, surrounding structures, and luggage are not damaged or ignited by the candles. It is essential that these mechanisms reliably shift the candles away from the housings to inhibit damage and fires. However, these known mechanisms and others are overly complex thereby inhibiting their reliability and unduly increasing their cost. Further, these systems occupy inordinate amounts of space.

SUMMARY OF THE INVENTION

The present invention overcomes the problems outlined above and provides an oxygen delivery unit with an improved oxygen generator shifting mechanism. By virtue of a unique release plate, the improved shifting mechanism allows the use of oxygen candles with longer operation times. Further the shifting mechanism is reliable and compact, so that it is possible to install larger oxygen candles in existing housings without replacing the entire oxygen delivery unit.

Broadly speaking, the oxygen delivery unit of the present invention has a housing defining an internal cavity. A release plate is attached to the housing wall, and an oxygen generator is coupled with the release plate. The oxygen generator is shiftable from a stored position juxtaposed to the housing wall to an activated position spaced apart from the housing wall. A release lanyard assembly is provided to secure the generator in the stored position and release the oxygen generator to the activated position.

In a preferred embodiment, the release plate comprises a flexible release plate having a curled position corresponding to the stored position of the oxygen generator and an uncurled position corresponding to the activated position of the generator. Because the release plate is flexible, it substantially conforms to the oxygen generator's outer configuration. The release plate is preferably elastically deformable and is biased toward the uncurled position. The release plate includes an attachment end attached to the housing wall and a free end defining spaced apart generator attachment slots therethrough. The generator is attached to the release plate adjacent the free end by spaced apart bands extending around the generator and through the attachment slots, so that the generator shifts relative to the release plate.

A release lanyard assembly engages the oxygen generator to secure it in the stored position. The release lanyard assembly includes a release tab having a release aperture for receiving a release pin holder therethrough. A release pin prevents the release pin holder from coming out of the release aperture. The release lanyard assembly also includes an adjustment joint operative to force the oxygen generator into the stored position. Release lanyard lines and activation lanyard lines extend from the generator to a respirator assembly for substantially simultaneous generator activation and generator shift to the activated position.

The oxygen delivery unit also preferably includes at least one resilient bumper pad contacting the release plate when the generator is in the activated position to inhibit noise and vibration. Further, a lanyard pad contacts an ignitor of the generator to prevent the activation lanyard lines from looping around the ignitor. Also, a heat shield is interposed between the generator and the housing wall to deflect heat away from the housing wall.

The invention is further directed to a shifting mechanism for use in an oxygen delivery unit. The shifting mechanism includes the above described release plate. In preferred forms, the weight of the generator also operates as part of the shifting mechanism.

DETAILED DESCRIPTION OF THE PREFERRED EMBODIMENTS

Figure 1:
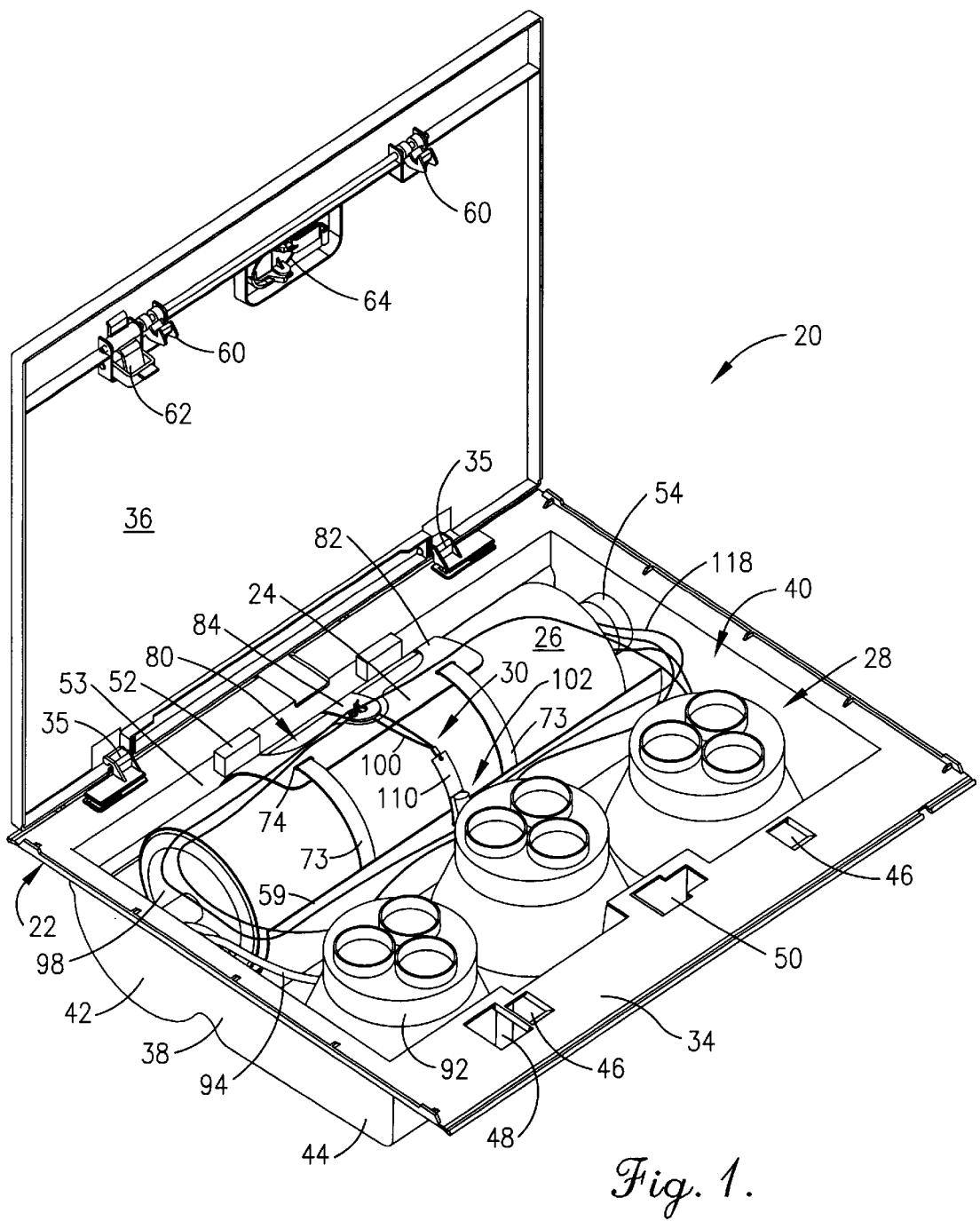
FIG. 1 is a perspective view of an oxygen delivery unit including a shifting mechanism according to the present invention.
Figure 2:
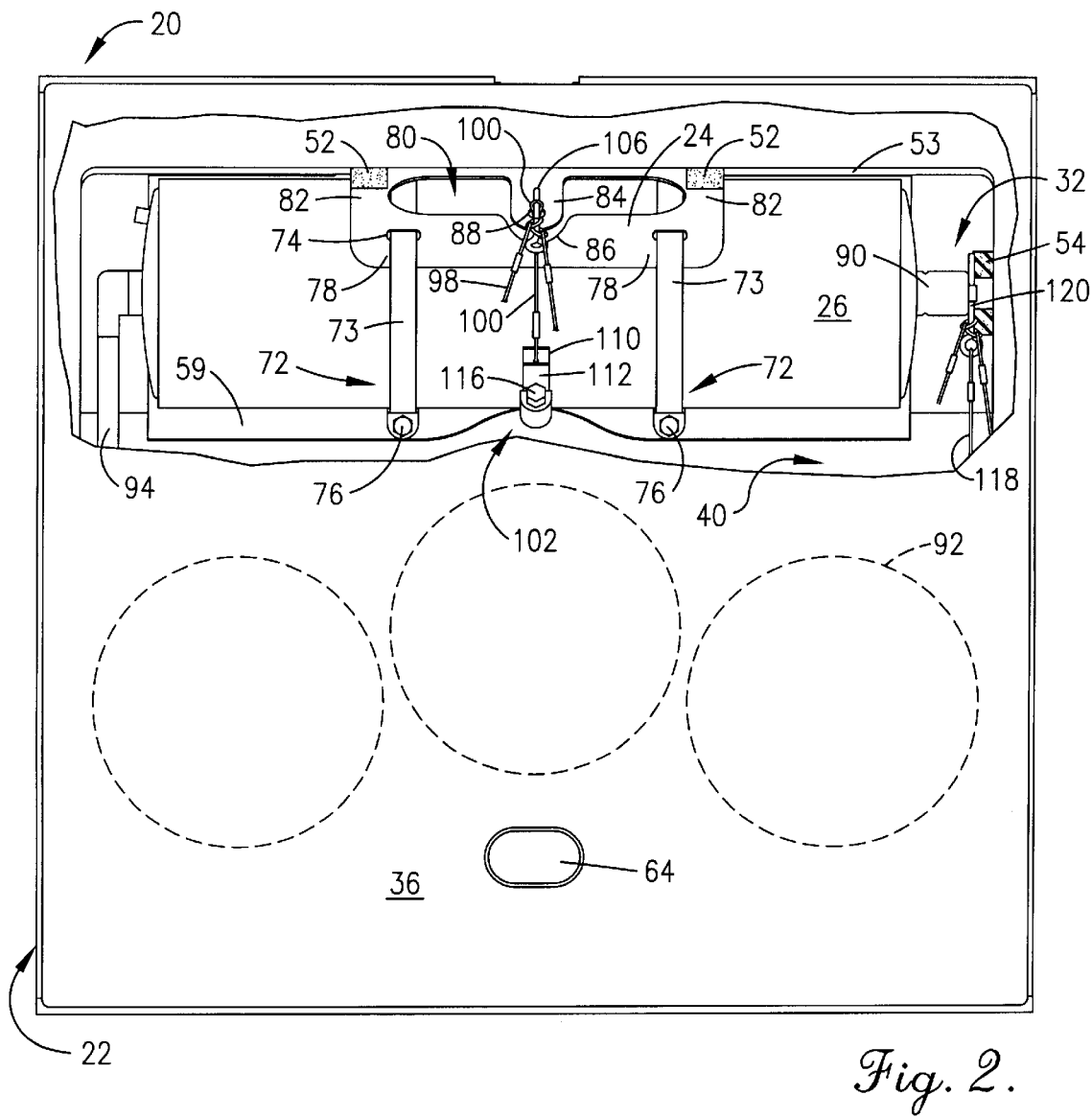
FIG. 2 is a top view of the oxygen delivery unit of FIG. 1 having a portion of a cover removed for illustrative purposes.

Turning now to the drawings, FIGS. 1 and 2 depict an oxygen delivery unit 20 comprising a housing 22, a release plate 24, a generator 26, a respirator assembly 28, a release lanyard assembly 30, and a generator activation lanyard assembly 32 (FIG. 2). The oxygen delivery unit 20 is preferably utilized in commercial passenger aircraft cabins to supply oxygen to at least one individual when a primary supply of oxygen has been contaminated or depleted as would occur during cabin depressurization.

Figure 4:
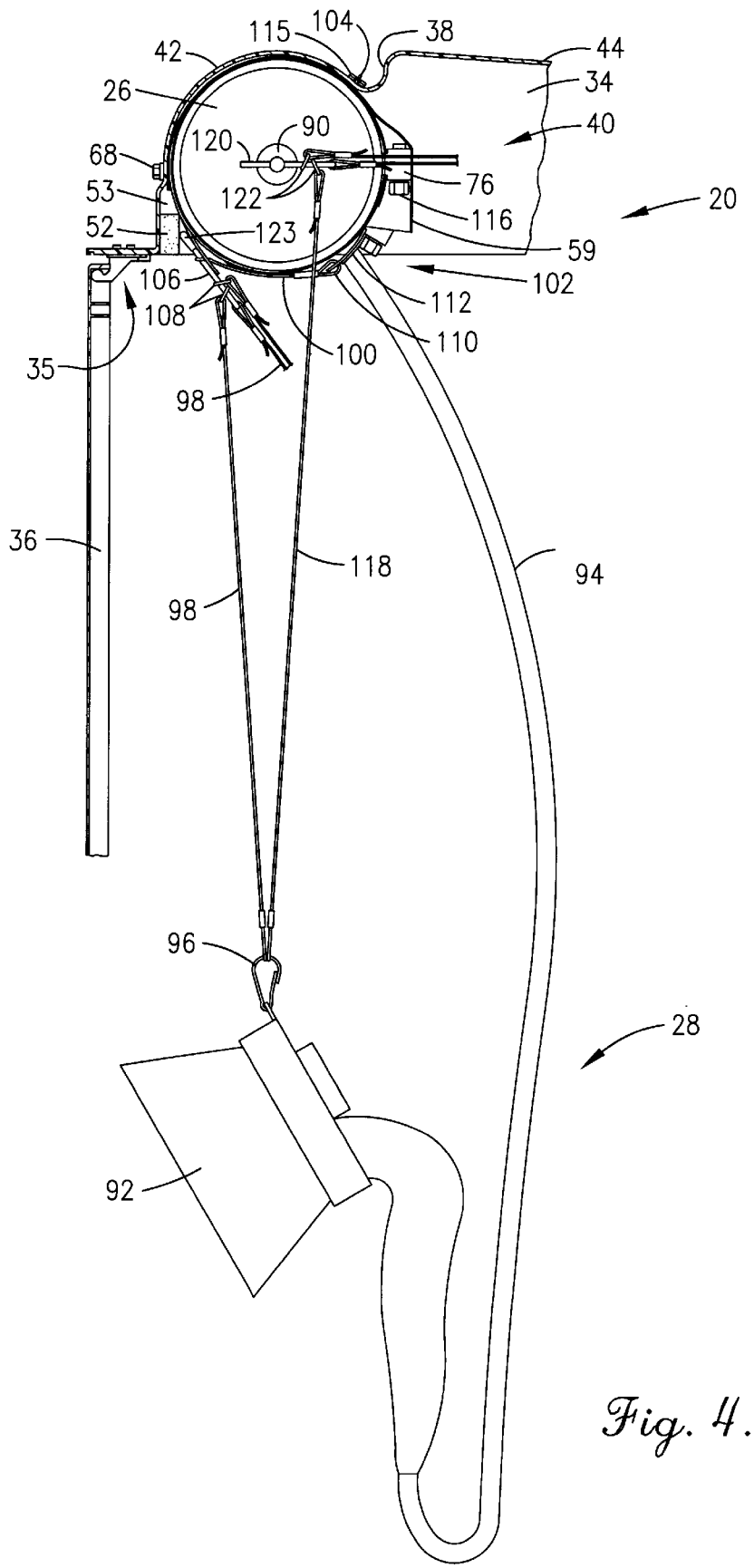
FIG. 4 is a side view, in partial cross-section, of the oxygen delivery unit of FIG. 1 illustrating a respirator assembly in a deployed position and an oxygen generator in a stored position.

In greater detail and with reference to FIGS. 1, 2, and 4, the housing 22 comprises a main body 34 and a cover 36. The housing 22 is generally rectangular, and the cover is hingably connected to the main body 34 by hinge connections 35. The housing 22 is configured to mount to surrounding structure in the passenger cabin of commercial passenger aircraft. Preferably, the housing mounts over the passenger seats just beneath the overhead luggage compartments.

The main body 34 of the housing 22 includes an outer housing wall 38 defining an internal cavity 40. The internal cavity 40 includes a generator receiving area and a mask receiving area. The housing wall 38 includes a generally arcuate portion 42 corresponding to the generator receiving area and a substantially rectangular portion 44 corresponding to the mask receiving area. The main body also includes latch openings 46, a latch release opening 48, and a test latch opening 50. The oxygen delivery unit also preferably includes at least one symmetrically positioned resilient bumper pad or pads contacting the release plate when the generator is in the activated position to inhibit noise and vibration. Preferably, two compressible bumper pads 52 are mounted on the internal side of the housing wall 38 adjacent the generator receiving area. The bumper pads 52 are adhered in a bumper recess 53 of the housing wall positioned adjacent and above (as oriented in FIG. 1) the arcuate portion 42 of the housing wall 38. The bumper pads, when not compressed, are preferably thicker than the recess. The recess 53, like the arcuate portion 42 and rectangular portion 44, preferably extends across the width of the internal cavity 40. A compressible gas generator lanyard pad 54 is also mounted on the internal side of the housing wall 38 adjacent the generator receiving area. The lanyard pad 54 is preferably adhered at an end of the generator receiving area adjacent to the activation lanyard end of the gas generator.

Figure 3:
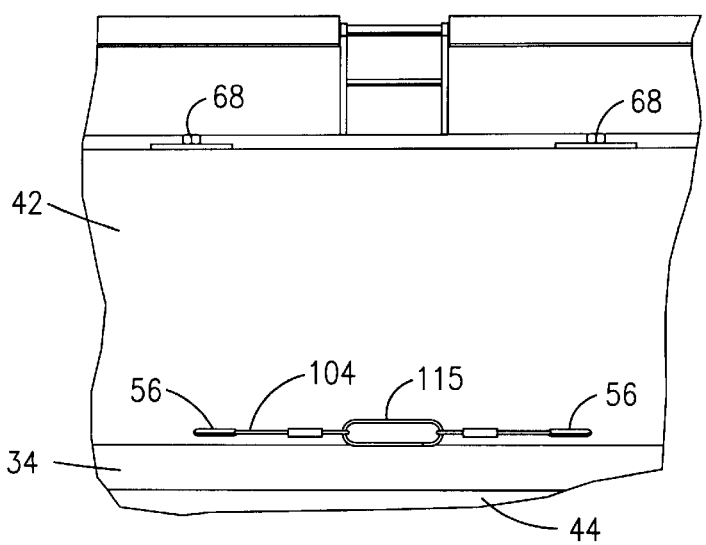
FIG. 3 is a fragmentary bottom view of the oxygen delivery unit of FIG. 1.

Referring to FIG. 3, the main body 34 of the housing 22 also includes a pair of release lanyard assembly openings 56 positioned in the arcuate portion 42 adjacent the rectangular portion 44 of the housing wall 38. The release lanyard openings 56 are spaced apart and are substantially centrally located relative to the length of the generator receiving area. A pair of release plate attachment openings 58 shown in FIG. 7 extend through the housing wall 38 adjacent the generator receiving area and in the arcuate portion 42 of the housing wall 38 adjacent the bumper recess 53.

Referring to FIGS. 1 and 2, the cover 36 of the housing 22 is generally rectangular and planar and is preferably sized to close the internal cavity 40 holding the respirator assembly 28 inside the internal cavity 40. The cover 36 mounts a pair of opposed cover latches 60, and includes a cover latch release mechanism 62 operatively coupled with the cover latches 60. The cover also mounts a test latch 64.

Figure 7:
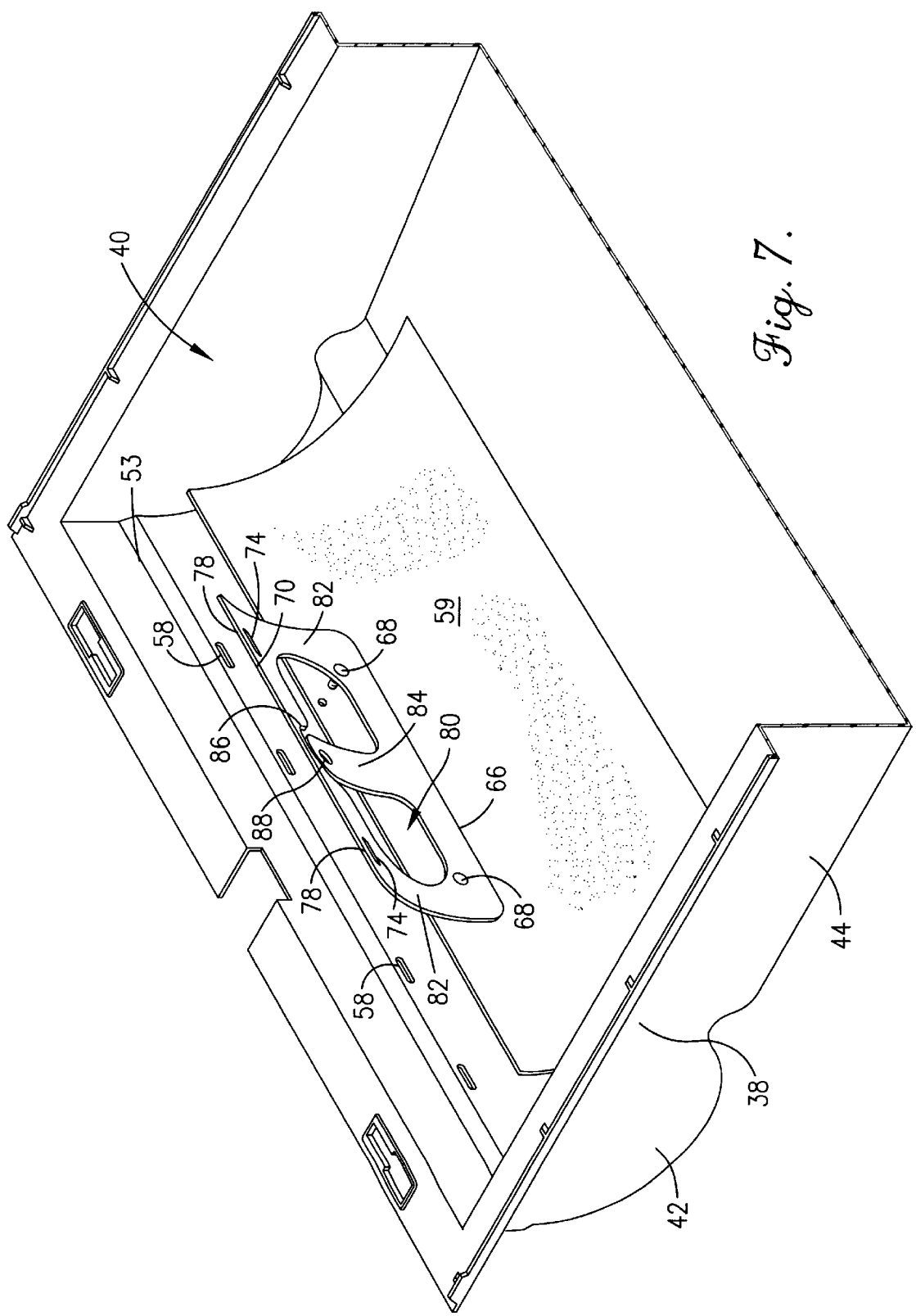
FIG. 7 is a fragmentary, exploded, perspective view of a housing and release plate of the oxygen delivery unit of FIG. 1.

Referring to FIGS. 2 and 7, the release plate 24 is preferably flexible and comprises a curled position and an uncurled position. The release plate 24 includes an attachment end 66 centrally attached to the housing wall 38 with fasteners 68 extending through the release plate attachment openings 58. The release plate is attached adjacent to the generator receiving area and opposite the mask receiving area. The release plate 24 also includes a free end 70 opposite the attachment end 66 which is coupled with the oxygen generator 26 with at least one but preferably a pair of spaced apart clamps 72 which extend through a pair of generator attachment slots 74 defined in the release plate 24 near the free end 70 thereof The clamps 72 preferably comprise flexible perimeter bands 73 which attach to the generator by extending around the perimeter of the generator 26. The clamps 72 include tightening mechanisms 76, preferably worm gears, utilized to tension the bands 73 around the generator 26. Because the bands 73 extend around the generator 26 and through the generator attachment slots 74, narrow portions 78 of the release plate 24 are held between the bands 73 and the generator 26. The narrow portions 78 are positioned between the free end 70 and the generator attachment slots 74.

The release plate 24 defines a central opening 80 which is generally rectangular. The central opening 80 is bounded at either end by release plate legs 82 and is centrally bifurcated by an integral release lanyard assembly tab 84 which is attached to the housing wall by virtue of being a part of the release plate. The release lanyard assembly tab 84 extends into a tab recess 86 positioned adjacent to the free end 70. A release aperture 88 extends through the release tab 84 adjacent to the tab recess 86. The outer corners of the release plate are preferably rounded, and the inner corners of the central opening 80 are also preferably rounded.

The release plate 24 is preferably fabricated from a metal material that is thin enough that the release plate 24 elastically deforms to flex between its curled and uncurled positions. The release plate is preferably biased in its uncurled position. However, the release plate still has a slight arc in its uncurled position. The release lanyard assembly tab 84 generally follows the curled and uncurled positions of the release plate 24.

Figure 6:
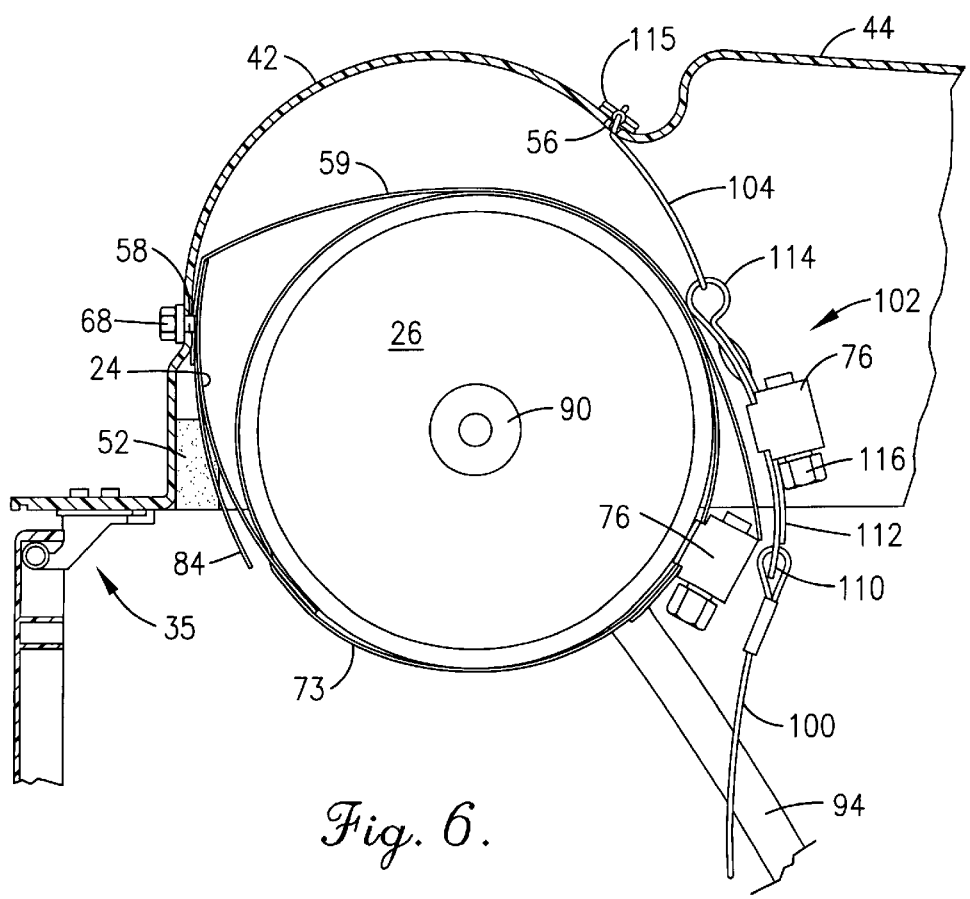
FIG. 6 is an enlarged fragmentary view of the oxygen delivery unit of FIG. 1 illustrating the oxygen generator in an activated position.

Referring to FIGS. 6 and 7, an aluminized KEVLAR® canopy 59 forms a heat shield attached to the housing wall 38 between the release plate 24 and the housing wall 38. The canopy is preferably thin and flexible, so that it conforms to the configuration of the generator 26 and the arcuate portion 42 of the housing wall 38 thereby conserving space.

Figure 5:
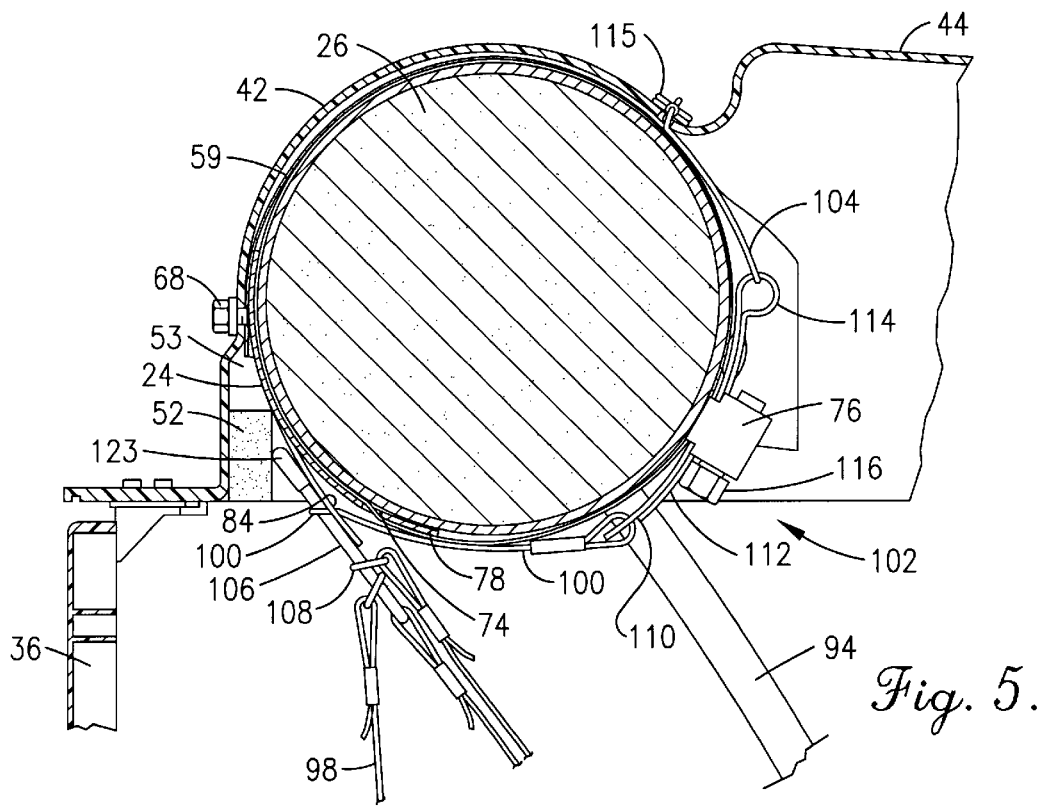
FIG. 5 is an enlarged fragmentary view of the oxygen delivery unit of FIG. 1 as shown in FIG. 4.

Referring additionally to FIGS. 1 and 5, the generator 26 has a relatively heavy weight, is substantially cylindrical, and is held in the generator receiving area of the internal cavity 40 by the release plate 24 and arcuate portion 42 of the housing wall 38. The generator 26 is shiftable between a stored position (FIGS. 1 and 5) in the generator receiving area juxtaposed the housing wall 38 and an activated position (FIG. 6) spaced apart from the housing wall. The stored position corresponds to the curled position of the release plate, and the activated position corresponds to the uncurled position of the release plate. Thus, because the release plate is biased toward the uncurled position, the generator is biased toward the activated position thereby making the shifting mechanism more reliable.

As best seen in FIG. 2, the generator 26 includes an ignitor 90 at one end and is operable to produce a supply of oxygen for up to, and exceeding twenty-two minutes. The ignitor 90 extends from the generator and contacts the lanyard pad 54. To produce oxygen, the generator 26 initiates a controlled exothermic reaction which operates at high temperatures in excess of 500° F. (260° C.). Because the release plate is flexible, it substantially performs to the outer cylindrical configuration of the oxygen generator 26.

Referring to FIGS. 1 and 4, the respirator assembly 28 includes a plurality of respirator masks 92 which have a stored location (FIG. 1) within the mask receiving area and a deployed location hanging outside and below the housing 22 (FIG. 4). An individual requiring oxygen pulls one of the masks from the deployed position to a use position. The masks 92 are in communication with the generator 26 through flexible oxygen lines 94 for transmitting oxygen from the generator, to the masks 92, and through the masks to the individuals. The masks 92 also include lanyard line attachment mechanisms 96, preferably clips, positioned near an edge of the masks.

Referring additionally to FIG. 5, the release lanyard assembly 30 includes release lanyard lines 98 and a release pin holder 100. The release pin holder 100 extends from an adjustment joint 102 which is connected to a release lanyard assembly mounting cable 104. The release tab 84 and release aperture 88 which are integral to the release plate 24 also form a portion of the release lanyard assembly 30.

The release lanyard lines 98 extend between the respirator assembly 28, specifically the masks 92, and the generator 26. The release lanyard lines 98 are attached at one end to the masks 92 by the lanyard line attachment mechanisms 96. An end cap 123 is placed on the end of the release pin 106. At their opposite ends, the release lanyard lines 98 have either a release pin 106 or a release ring 108. The release pin holder 100 comprises a flexible cable attached to the adjustment joint 102. The adjustment joint 102 includes a small flexible plate 110, a thread plate 112 having a closed looped end 114 and a threaded member 116. The tightening mechanism 76 of the clamps 72 are substantially the same as the adjustment joint 102 which, as described, is a worm gear.

The flexible plate 110 is slidably coupled with the thread plate 112, and the threaded member operatively engages the thread plate 112. As shown in FIG. 3, the mounting cable 104 extends through the closed loop end 114 of the adjustment joint 102 and through the release lanyard openings 56 in the housing wall 38 to attach the adjustment joint 102 and release pin holder 100 to the housing 22. Ends of the mounting cable are connected by a clip 115 outside the internal cavity and opposite the cover.

Referring to FIGS. 2 and 4, the generator activation lanyard assembly 32 includes a plurality of activation lanyard lines 118 attached at one end to the respirator assembly 28, specifically the masks 92, by the attachment mechanism 96. The opposite end of the activation lanyard lines 118 include either a release pin 120 or a release ring 122. The release pin 120 extends through the release rings 122 and engages the ignitor 90 of the generator 26. The release pin and rings 120, 122 of the activation assembly are preferably identical to the release pin and rings 106, 108 of the release assembly.

In operation and referring initially to FIGS. 1, 2, and 5, the oxygen delivery unit 20 is mounted in a desired location in a commercial passenger aircraft or other environment where a supplemental oxygen supply might be needed. The respirator assembly 28 is positioned inside the mask receiving area of the internal cavity 40, and the generator 26 is held in the stored position in the generator receiving area of the internal cavity. When the release lanyard assembly 30 engages the generator to secure it in the stored position, the release pin 106 extends through the release rings 108, and the release pin holder 100 is extended through the release aperture 88 of the release tab 84. The release pin 106 also extends through the loop of the release pin holder 100 to releasably hold the release pin holder 100 in the release aperture 88. The threaded member 116 is rotated to slide the flexible plate 110 relative to the threaded plate 112 thereby tensioning the mounting cable 104 and the release pin holder 100. The end cap 123 placed on the release pin 106 assists the retention of the release pin 106 by the loop of the release pin holder 100 prior to achieving desired tension of the mounting cable 104 and release pin holder 100. The tensioning of the mounting cable 104 and release pin holder 100 forces the generator against the arcuate portion 42 of the housing wall 38 and into the stored position. The tensioning also compresses the release plate 24 into the curled position holding the release plate against the outer configuration of the generator 26. Further, the release tab 84 is tensioned holding it against the outer configuration of the generator. The release plate and release tab substantially conform to the outer configuration of the generator to conserve space. Thus, the generator 26 is held in the stored position in the generator receiving area against the spring bias of the release plate 24.

The cover 36 is closed over the main body 34 of the housing 22 to close the internal cavity 40 and hold the respirator assembly 28 inside the housing 22. The cover latches 60 engage the latch openings 46 to latch the cover in the closed position. When a predetermined condition occurs such as the ordinary supply of oxygen is contaminated or depleted by, for example, passenger cabin depressurization, the latch release 62 is automatically engaged through the latch release opening 48, and the cover pivots about the hinge connections 35 to the open position. After the cover 36 opens automatically, the masks 92 drop to their deployed position outside the housing 22 and are suspended below the housing by the lanyard lines 98, 118 as shown in FIGS. 4 and 5. To test the automatic opening of the cover 36 without deploying the masks 92, the test latch 64 is placed into the test latch opening to prevent the cover from pivoting to the completely open position.

The activation lanyard lines 118 extend from the ignitor 90, and because the ignitor 90 contacts the lanyard pad 54, the activation lanyard lines 118 cannot loop around the ignitor 90. Thus, the activation lanyard lines 118 do not become entangled with the ignitor 90 which could prevent an individual from activating the generator 26. The spacing pad 55 engages the opposite end of the generator to reliably position the generator, so that the ignitor 90 abuts the lanyard pad.

Referring to FIG. 6, if an individual grasps any one of the masks 92 and pulls it downwardly toward the use position on the individual's face, the release pin 106 is pulled from the release pin holder 100 allowing the release plate to uncurl to its biased position thereby spring shifting the generator 26 to the activated position away from the housing wall generally in the path of a non-circular arc. Thus, by pulling the mask, the release lanyard assembly 30 disengages the generator, and the generator moves to the use position in a non-pivoting fashion.

The weight of the oxygen generator also biases the generator 26 downwardly away from the housing wall 38 to shift the generator to the activated position, and the generator also shifts relative to the release plate. As the release plate straightens, a gap is created between the release plate and the generator except at the free end where the bands 73 connect the generator to the release plate 24. Preferably, the bands 73 are tensioned by the tightening mechanism 76, so that there is no appreciable relative movement between the generator 26 and the release plate 24 where the bands 73 connect the generator 26 to the release plate 24. The narrow portions 78 can be sized to allow the release plate to deform thereby further shifting the generator Thus, the release plate and weight of the generator combine to form a reliable shifting mechanism to shift the generator downwardly and horizontally away from the housing wall 38.

The bumper pads 52 contact the release plate 24 near its legs 82 as the generator shifts into the activated position compressing the pads to dampen vibrations and inhibit noise. Further, as the generator and release plate might oscillate back and forth during turbulence, the bumper pads 52 also dampen such oscillations and inhibit noise caused by such oscillations.

Additionally, as the individual pulls the mask toward the use position the activation release pin 120 is removed from engagement with the ignitor 90, and without the activation lanyard assembly to restrain it, the ignitor 90 ignites the generator. Preferably, the masks 92 are suspended by both the release lanyard lines 98 and the activation lanyard lines 118 which together conform a Y-shape (FIG. 4), and the lengths of the lanyard lines 98, 118 are selected to substantially simultaneously shift the generator from the stored position to the activated position and ignite the generator. The aluminized aramid fiber woven fabric canopy 59 reflects heat downwardly away from the housing wall 38 and reduces convective heat transfer from the generator to the housing wall 38. Thus, the canopy 59 and the space between the generator and the housing wall prevent the generator from damaging or igniting the housing wall and other surrounding structures.

Thus, the oxygen delivery unit 20 according to the present invention provides a compact and reliable shifting and activation mechanism for shifting an exothermic oxygen generator away from the housing wall. Therefore, oxygen generators having longer operational times can be used in new delivery units without increasing their size and be retrofitted into existing delivery units.

We claim:

1. An oxygen delivery unit for use in commercial passenger aircraft, the delivery unit comprising:
    a housing for mounting to surrounding structure, the housing having a housing wall defining an internal cavity including a generator receiving area and a mask receiving area;
    a movable release plate attached to the housing wall adjacent the generator receiving area and having a translatable outer portion;
    an oxygen generator coupled with the release plate outer portion and being movable together with the release plate outer portion from a stored position in the generator receiving area juxtaposed the housing wall to an activated position spaced apart from the housing wall;
    a respirator assembly including a plurality of respirator masks having stored locations within the mask receiving area and deployed locations outside the housing, the masks being in communication with the oxygen generator for transmitting oxygen from the oxygen generator to the individuals;
    a release lanyard assembly connected to the respirator assembly and engaging the oxygen generator to secure the generator in the stored position, and the release lanyard assembly being operative to disengage the oxygen generator when one of the masks of the respirator assembly is transferred to a use position by one of the individuals thereby shifting the oxygen generator from the stored position to the activated position; and
    a generator activation lanyard assembly connected to the respirator assembly, and connected to the generator, the generator activation lanyard assembly being operative to cause the generator to ignite when one of the masks of the respirator assembly is transferred to a use position by one of the individuals.

2. The oxygen delivery unit according to claim 1 wherein the release lanyard assembly and the generator activation lanyard assembly each comprise lanyard lines extending from the respirator assembly to the generator, respectively for substantially simultaneous generator activation and generator shift to the activated position.

3. The oxygen delivery unit according to claim 1 further comprising a bumper pad mounted on the housing wall and being located to contact the release plate when the generator is in the activated position to inhibit noise and vibration, and a heat reflective and containing canopy interposed between the oxygen generator and the housing wall.

4. The oxygen delivery unit according to claim 1 wherein the oxygen generator comprises an outer configuration, and the release plate substantially conforms to the outer configuration of the oxygen generator.

5. The oxygen delivery unit according to claim 1 wherein the release lanyard assembly includes an adjustment joint operative to force the oxygen generator into the stored position.

6. The oxygen delivery unit according to claim 1 further comprising a flexible heat shield interposed between the generator and the housing wall; and wherein the oxygen generator shifts both downwardly and horizontally away from the housing wall.

7. An oxygen delivery unit comprising:
    a support adapted for attachment to a body and presenting a movable portion spaced from the body;
    an oxygen generator;
    a coupler securing said generator to said movable portion of said support, said support including structure permitting the movable portion and the generator to alternately assume a stored position relative to said body, and a different use position where the movable portion and generator are spaced from said stored position thereof; and
    a retainer releasably holding the movable portion and said generator in said stored position,
    said movable portion and said generator coupled thereto being movable together, upon release of said retainer, from said stored position to said different use position, whereby the generator is shifted relative to said body.

8. The unit of claim 7, said support comprising a plate.

9. The unit of claim 8, said plate assuming a relatively curled configuration in said stored position, and a relatively uncurled configuration in said use position, said movable portion of said plate moving along an arcuate path of travel between said stored and said use positions.

10. The unit of claim 7, said coupler comprising a band circumscribing said generator and attached to said support.

11. The unit of claim 7, said support being formed of flexible metal material which, when said movable portion and generator are in said stored position, biases the movable portion and generator towards said use position.

12. The unit of claim 7, said retainer comprising a release lanyard assembly engaging said generator to secure the generator in said stored position, the lanyard assembly being operative to disengage the generator and permit movement of said movable portion and generator.

13. The unit of claim 12, wherein the assembly comprises a release tab having a release aperture therethrough, a release pin holder, and a release pin, the release tab being attached to said body, and while engaging the oxygen generator in the stored position thereof, the pin holder extends through the release aperture, and the release pin releasably holds the release pin holder in the release aperture.

14. The unit of claim 7, said generator being shiftable relative to said movable portion when said movable portion and generator move from said stored position to said use position.

15. The unit of claim 7, including a housing having a wall, said support being attached to said wall.

* * * * *